US009818235B1

(12) United States Patent
Rotman et al.

(10) Patent No.: US 9,818,235 B1
(45) Date of Patent: Nov. 14, 2017

(54) ITEM DIMENSION VERIFICATION AT PACKING

(71) Applicant: Amazon Technologies, Inc., Seattle, WA (US)

(72) Inventors: Cary Rotman, Seattle, WA (US); Cameron Lee Skinner, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 110 days.

(21) Appl. No.: 14/857,675

(22) Filed: Sep. 17, 2015

Related U.S. Application Data

(63) Continuation of application No. 13/785,333, filed on Mar. 5, 2013, now Pat. No. 9,142,035.

(51) Int. Cl.
*G06K 9/00* (2006.01)
*G07B 17/00* (2006.01)
*G06K 9/52* (2006.01)
*G06T 7/60* (2017.01)

(52) U.S. Cl.
CPC ......... *G07B 17/00661* (2013.01); *G06K 9/52* (2013.01); *G06T 7/60* (2013.01); *G07B 2017/00685* (2013.01)

(58) Field of Classification Search
None
See application file for complete search history.

(56) References Cited

U.S. PATENT DOCUMENTS

| | | |
|---|---|---|
| 5,105,392 A | 4/1992 | Stringer et al. |
| 5,179,651 A | 1/1993 | Taaffe et al. |
| 5,430,831 A * | 7/1995 | Snellen ............ G06F 17/509 345/423 |
| 5,737,438 A | 4/1998 | Zlotnick et al. |
| 6,138,371 A | 10/2000 | Lippa et al. |
| 6,189,223 B1 | 2/2001 | Haug |
| 6,615,104 B2 | 9/2003 | England et al. |
| 6,705,526 B1 | 3/2004 | Zhu et al. |
| 6,721,762 B1 | 4/2004 | Levine et al. |
| 7,689,465 B1 | 3/2010 | Shakes et al. |
| 7,707,008 B1 | 4/2010 | Champlin et al. |
| 7,769,221 B1 | 8/2010 | Shakes et al. |
| 7,788,883 B2 | 9/2010 | Buckley et al. |
| 7,813,974 B1 | 10/2010 | Braum et al. |
| 7,873,549 B1 | 1/2011 | Mishra et al. |

(Continued)

OTHER PUBLICATIONS

U.S. Patent Application entitled, "Inventory Distribution in a Hybrid Fulfillment Network," Inventor: Cholewinski, et al.; filed Jun. 20, 2011; U.S. Appl. No. 13/164,539.

*Primary Examiner* — Kim Vu
*Assistant Examiner* — Molly Delaney
(74) *Attorney, Agent, or Firm* — Athorus, PLLC

(57) ABSTRACT

This disclosure describes systems and methods for automatically verifying stored item dimension values and package utilization at packing. In some implementations, an image(s) of a package that includes items of a shipment set is captured at a pack station and analyzed to determine an actual package utilization. The actual package utilization is compared to an expected package utilization. If a difference between the expected package utilization and the actual package utilization is identified, it may be determined that the stored item dimension values may be inaccurate.

20 Claims, 6 Drawing Sheets

(56) References Cited

U.S. PATENT DOCUMENTS

| | | |
|---|---|---|
| 7,941,244 B2 | 5/2011 | Somin et al. |
| 7,974,891 B2 | 7/2011 | Shakes et al. |
| 8,086,344 B1 | 12/2011 | Mishra et al. |
| 8,103,377 B1 | 1/2012 | Wong et al. |
| 8,170,706 B2 | 5/2012 | Gombert et al. |
| 8,170,712 B2 | 5/2012 | Battles et al. |
| 8,244,603 B1 | 8/2012 | Tang et al. |
| 8,260,455 B2 | 9/2012 | Redford et al. |
| 8,340,812 B1 | 12/2012 | Tian et al. |
| 8,341,040 B1 | 12/2012 | Young et al. |
| 8,401,975 B1 | 3/2013 | Tian et al. |
| 8,588,496 B2 | 11/2013 | Wang et al. |
| 8,781,159 B2 | 7/2014 | Sones et al. |
| 9,098,822 B1 | 8/2015 | Doshi et al. |
| 2002/0087338 A1 | 7/2002 | Haydt |
| 2002/0118874 A1* | 8/2002 | Chung ................... G06T 17/10 382/154 |
| 2003/0083763 A1* | 5/2003 | Kiyohara ............. G06Q 10/087 700/97 |
| 2004/0153379 A1 | 8/2004 | Joyce et al. |
| 2004/0267677 A1 | 12/2004 | Mitsuoka et al. |
| 2005/0100136 A1 | 5/2005 | Kawatsu |
| 2006/0013457 A1 | 1/2006 | Ritter |
| 2007/0286469 A1 | 12/2007 | Yamagata et al. |
| 2009/0245609 A1 | 10/2009 | Sakaida et al. |
| 2009/0310836 A1 | 12/2009 | Krishnan et al. |
| 2009/0313948 A1* | 12/2009 | Buckley ............... G06Q 10/083 53/456 |
| 2010/0145504 A1 | 6/2010 | Redford et al. |
| 2010/0202702 A1* | 8/2010 | Benos .................... G06T 7/602 382/200 |
| 2011/0002515 A1 | 1/2011 | Futami et al. |
| 2013/0011027 A1 | 1/2013 | Zillner |
| 2013/0218799 A1 | 8/2013 | Lehmann et al. |
| 2013/0247519 A1 | 9/2013 | Clark et al. |

\* cited by examiner

ITEM DIMENSION VERIFICATION AT PACKING

CROSS-REFERENCE TO RELATED APPLICATIONS

This application is a continuation of and claims priority to U.S. patent application Ser. No. 13/785,333, filed Mar. 5, 2013, titled ITEM DIMENSION VERIFICATION AT PACKING, the contents of which are incorporated by reference herein in their entirety.

BACKGROUND

Many companies package items and/or groups of items together for a variety of purposes, such as e-commerce and mail-order companies that package items (e.g., books, CDs, apparel, food, etc.) to be shipped to fulfill orders from customers. Retailers, wholesalers, and other item distributors (which may collectively be referred to as distributors) typically maintain an inventory of various items that may be ordered by clients or customers. This inventory may be maintained and processed at a materials handling facility which may include, but is not limited to, one or more of: warehouses, distribution centers, cross-docking facilities, order fulfillment facilities, packaging facilities, shipping facilities, or other facilities or combinations of facilities for performing one or more functions of material (inventory) handling.

Common concerns with fulfilling items and/or groups of items involves optimizing the picking of items from a materials handling facility and ensuring that appropriate packaging is used for shipping those items.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

Figure 1:
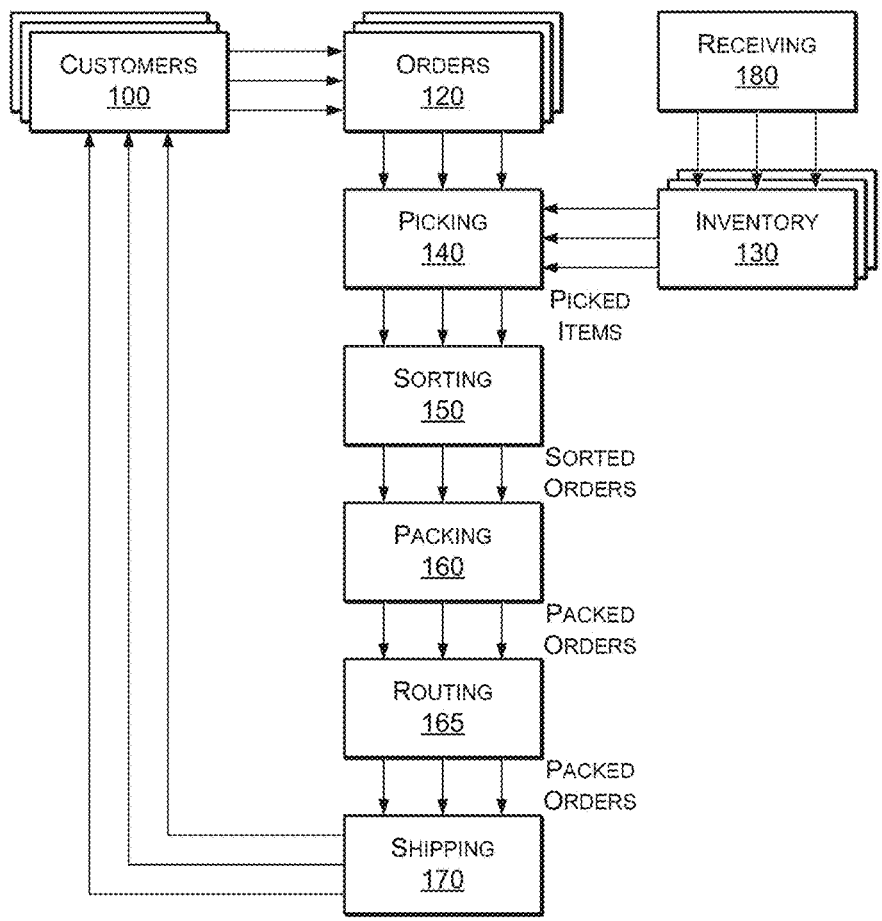
FIG. 1 illustrates a broad view of the operations of a materials handling facility, in one implementation.

While implementations are described herein by way of example, those skilled in the art will recognize that the implementations are not limited to the examples or drawings described. It should be understood that the drawings and detailed description thereto are not intended to limit implementations to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

This disclosure describes systems and methods for automatically verifying item dimensions and package utilization. Maintaining accurate dimension values for items helps in selection of the appropriate package for shipment and storage of item inventory. For example, if the stored dimension values of an item are substantially larger than the actual dimension values, a package that is too big for the item may be recommended and used. Shipping an item in a package that is too large often results in unneeded shipping costs (e.g., excessive dunnage, increased package cost, increased transportation cost) as well as possible item damage from the item shifting during transit or the package crushing when stacked because there is no internal support from the item.

The systems and methods described herein may be implemented as part of the picking and/or packing of an item such that the dimension values are verified while the item is being handled for shipment. For example, when a user orders an item from an e-commerce website for shipment, the stored dimension values may be obtained and a package capable of containing the item for shipping recommended based on those stored dimension values. In addition, an expected package utilization may be determined based on the stored item dimension values and the stored dimension values for the recommended package.

The stored item dimension values may be verified by capturing an image of the item after it is placed in the recommended package but before the package is sealed for shipping. The captured image may be analyzed to determine how much of the interior of the package is filled by the item (i.e., the actual package utilization).

If the actual package utilization is different than an expected package utilization, it may be determined that the stored dimension values of the item are inaccurate. As discussed further below, in some implementations, a degree of tolerance, or threshold, may be considered before stored item dimension values are considered inaccurate. This tolerance, or threshold, may be a percentage of deviation from the expected package utilization or a dimensional difference.

The captured image may also be analyzed to determine whether the appropriate dunnage and/or other protective material has been placed in the package. For example, some items may be fragile and need additional protective material. Once the item is packed and before the package is sealed for shipping an image can be captured and analyzed to confirm that the appropriate dunnage exits.

Still further, in some implementations, an image captured during packing can be used to verify that the appropriate item has been placed in the package for the shipment. A verification service may analyze the image to identify the item and confirm that the packed item matches the ordered item.

While the disclosure herein focuses primarily on the ordering, picking, packing and shipping of a single item, the implementations described herein are equally applicable to implementations handling any number of items. For example, if a user has ordered two items, the configuration of the items when placed in the package may be determined, the combined item dimensions approximated to determine the total cubic size of the combined items and to determine the expected package utilization.

In some implementations, a packaging information system configured to facilitate stowing, picking, packing and/or shipping operations may include various components used to facilitate efficient and/or cost-effective operations in a materials handling facility. For example, a packaging information system may include an inventory management system, a planning service, a packaging recommendation service and/or an item dimension verification service, which may be utilized together or separately to facilitate efficient and/or cost-effective operations in the materials handling facility.

As used herein, the term "shipment set" may refer to a single item to be shipped, or to multiple items that have been grouped together for shipment. For example, a shipment set may represent a single item from a customer's order, multiple items from a customer's order, or all items from a customer's order. The term "package" may refer to any dimensionally-constrained environment, such as crates, cases, bins, boxes, bags, mailing envelopes or folders, or any other apparatus capable of handling a shipment set for storing, conveying or transporting.

For illustrative purposes, some implementations of a packaging information system (and/or various components thereof) are discussed below in which particular item and/or package parameters are analyzed in particular manners, and in which particular types of analyses and processing of parameters is performed. However, those skilled in the art will appreciate that the techniques described may be used in a wide variety of other situations and that other implementations are not limited to the details of these example implementations.

A block diagram of a materials handling facility, which, in one implementation, may be an order fulfillment facility configured to utilize various systems and processes described herein, is illustrated in FIG. 1. In this example, multiple customers 100 may submit orders 120, where each order 120 specifies one or more items from inventory 130 to be shipped to the customer or to another entity specified in the order. An order fulfillment facility typically includes a receiving operation 180 for receiving shipments of stock from various vendors and storing the received stock in inventory 130. To fulfill the orders 120, the item(s) specified in each order may be retrieved or "picked" from inventory 130 (which may also be referred to as stock storage) in the order fulfillment facility, as indicated by picking operation 140. In some implementations, the items of a customer order may be divided into multiple shipment sets for fulfillment by an order planning system before fulfillment instructions are generated (not shown).

In this example, picked items may be delivered to one or more stations in the order fulfillment facility for sorting 150 into their respective shipment sets and for packing 160. A package routing operation 165 may sort packed orders for routing to one of two or more shipping operations 170, from which they may be shipped to the customers 100. The package routing operation 165 may in various implementations be automated or manual. The package routing operation 165 may receive an indication of the destination to which each packed order should be routed from a central control system.

In some implementations, the routing operation may route the picked or sorted items to a particular packing station 160 depending upon the size or type of the packaging into which the items are to be packaged. For example, not all shipping packages utilized in the facility may be available at all of the packing stations 160. Similarly, some packing stations 160 may not have access to protective materials recommended for shipping fragile items or items for which additional protection may be appropriate. Therefore, if a shipment set requires special packaging, a routing operation may be configured to direct the item(s) to a packing station 160 at which an appropriate shipping package and/or protective materials are available. Likewise, if a fragile item is selected for picking and placement into a delivery package or transfer package, it may be routed to a packing station (not shown) at which appropriate protective material or packaging is available to allow for proper handling of the item(s).

In some implementations, a packaging recommendation may be dependent on the customer to whom the item or items is to be shipped, an applicable service level agreement, the destination of the item, an indicator of the fragility of the item, the weight of the item, and/or an environmental constraint associated with the item (e.g., a restriction on the temperature and/or humidity at which the item should be held during transport). In addition, a packaging recommendation may also be based on ensuring a good customer experience.

In some implementations, items received at receiving 180 may not be stock inventory and may be processed and delivered to the package routing operation 165 for shipping 170 to the customer 100. For example, receiving 180 may receive an item from a merchant that is to be delivered to a customer 100. In another example, receiving may receive items from another materials handling facility or another vendor destined for a customer 100.

Note that not every fulfillment facility may include both sorting and packing stations. In certain implementations, agents may transfer picked items directly to a packing station, such as packing station 160, while in other implementations, agents may transfer picked items to a combination of sorting and packing stations (not illustrated). This may result in a stream and/or batches of picked items for multiple incomplete or complete shipment sets being delivered to a sorting station for sorting 150 into their respective shipment sets for packing and shipping, according to one implementation.

Portions of a shipment set may be received at different times or during different time intervals. When portions of a shipment set do not arrive during the same time interval, sorting 150 and packing 160 may have to wait for one or more items of some shipment sets to be delivered to the sorting station(s) before processing of the shipment set can be completed. Note that a picked, packed and shipped shipment set does not necessarily include all of the items ordered by the customer; a shipped shipment set may include only a subset of the ordered items available to ship at one time from one materials handling facility. Also note that the various operations of a materials handling facility may be located in one building or facility, or alternatively may be spread or subdivided across two or more buildings or facilities.

The arrangement and order of operations illustrated by FIG. 1 is merely one example of many possible implementations of the operation of a materials handling facility, such as an order fulfillment facility. Other types of materials handling, manufacturing, or order fulfillment facilities may include different, fewer, or additional operations and resources, according to different implementations.

Figure 2:
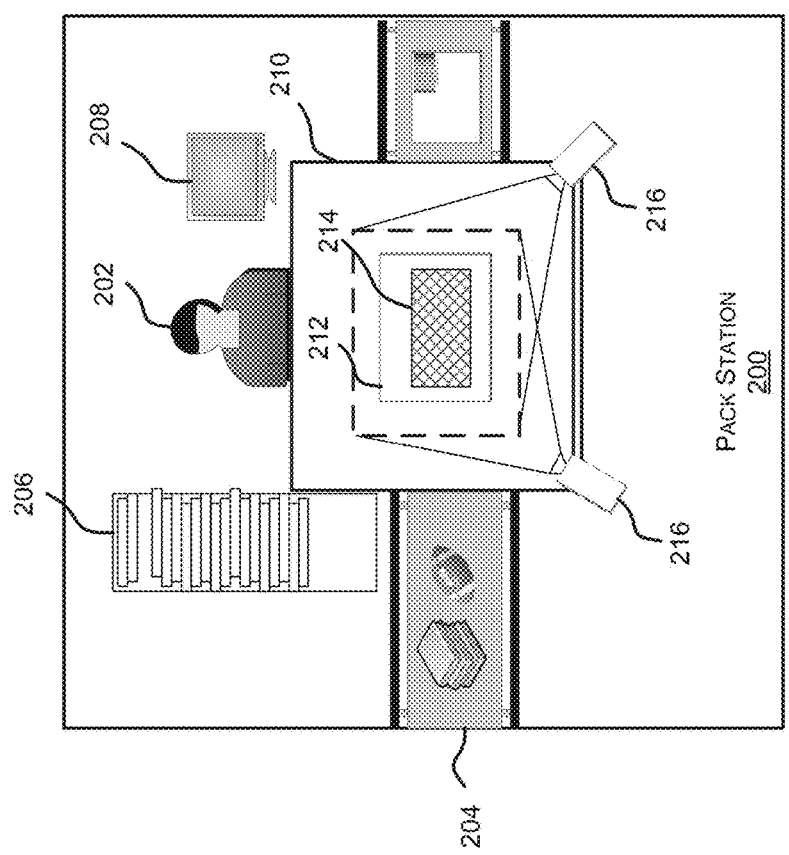
FIG. 2 illustrates a broad view of a packing station, in accordance with an implementation.

FIG. 2 illustrates a partial view of a pack station 200 that may be utilized as part of the packing operation 160 (FIG. 1), in accordance with an implementation. The pack station 200 allows at least one packer 202 to receive instructions for packing shipment sets into a package for shipment. The items of a shipment set may be received at the pack station 200 in a variety of fashions. For example, items of a shipment set may be received on a conveyer, such as inbound conveyer 204, arrive manually from a picker, arrive in a tote, cart, or by other automated or mechanical means. Once all items of the shipments arrive, the packer 202 may select a package from the package stack 206 into which the items may be placed for shipping. In some implementations, the packer 202 may receive information regarding a shipment set and/or a recommended package via an output, such as a display 208. The display 208, may identify to the packer 202 the items of the shipment set that are to be included in a package as well as the recommended package into which items of the shipment set are to be packed. In some implementations, for a shipment set with multiple items, the display 208 may also present to the packer 202 the configuration as to how the items of the shipment set are to be placed into the package for packing.

Based on the information provided to the packer 202, the packer 202 may retrieve the recommended package from the package stack 206 and place it on the pack table 210 for packing. For example, as illustrated in FIG. 2 the packer 202 has placed package 212 on the pack table 210 and placed a shipment set 214 into the package 212. Once all the items of the shipment set 214 have been placed into the package 212 one or more image capture devices 216 may capture an image of the package 212 with the items of the shipment set 214 contained therein. The image of the package containing the items of the shipment set may be captured as one or more still images or as a series of images (i.e., video). Likewise, in some implementations, multiple images or a series of images may be taken as the items are being packed in the package 212 or after all the items have been placed into the package 212. Likewise, the image of the package 212 containing the shipment set 214 may be captured before or after any additional dunnage and/or other protective material is placed into the package 212 for shipment.

In some implementations, a single image capture device 216 may be positioned directly above the pack table such that a package 212 containing a shipment set 214 can be imaged as it is being packed for shipment. In other implementations, a single image capture device may be offset to the side or at another location to capture the image of the package and the items as they are being packed. In other implementations, such as the one illustrated in FIG. 2, multiple image capture devices 216 may be positioned at, around or above the pack table 210 so that multiple images of the package 212 and the items placed into the package can be captured and analyzed. Using multiple image capture devices 216, a stereo image or other three dimensional image of the package and the items within the package can be rendered and used for analysis to determine actual package utilization.

Regardless of how or how many images are taken of the package and the contained items, the dimension verification service, as described in more detail below, may analyze the image to determine the actual package utilization by determining the amount of free space that remains within the package 212. In addition to computing the actual package utilization, the dimension verification service may also determine the expected package utilization based on the stored dimension values of the items placed in the package as well as the stored dimension values of the recommended package. Utilizing the expected package utilization and the actual package utilization, a determination may be made as to whether the utilizations are within a selected or defined tolerance or whether the utilization is not as expected. For example, the dimension verification service may maintain an expected usage threshold and if the actual package utilization does not satisfy that threshold it may be determined that the stored dimension values of the items in the shipment set are inaccurate.

For example, if an ordered item has stored dimension values of 4"×2"×50", the volume of the item is 400 cubic inches. Based on the total cubic size of the item, the package recommendation engine may recommend a package having dimension 5"×4"×50", as that package has capacity for the item and is the closest dimension values to the item. A package with dimension values of 5"×4"×50" is 1.000 cubic inches. In this example, the resulting expected package utilization is 40% (400/1,000). When the item arrives at the pack station 200, the package recommendation engine may recommend to the packer 202 via the display 208 to select the recommended package with the dimension values of 5"×4"×50". The packer 202 may select the recommended package, place the received item in the package and the image capture device 216 may capture an image(s) of the package with the contained item.

The dimension verification service may analyze the captured image(s) and determine that the actual package utilization is only 0.4%, which means that the actual volume of the item is 4 cubic inches not 400 cubic inches (0.4%*1,000 in.$^3$). Such an error may occur when a merchant or other seller of the item is initially providing dimension values for the item. In this example, the merchant selling the item provided dimension values of 4"×2"×50", rather than the actual dimension values of 4"×2"×0.5".

By detecting the error in the dimension values through computation of the actual package utilization compared to the estimated package utilization, the dimension verification service may identify inaccuracies in the stored item dimension values as part of the packing process, rather than having to manually review each of the items stored in the materials handling facility. In this example, once an inaccuracy is identified, the packaging information system may identify that the item likely has inaccurate stored dimension values and should be reviewed. As discussed in further detail below, review and correction of stored item dimension values may be done automatically and/or manually.

Figure 3:
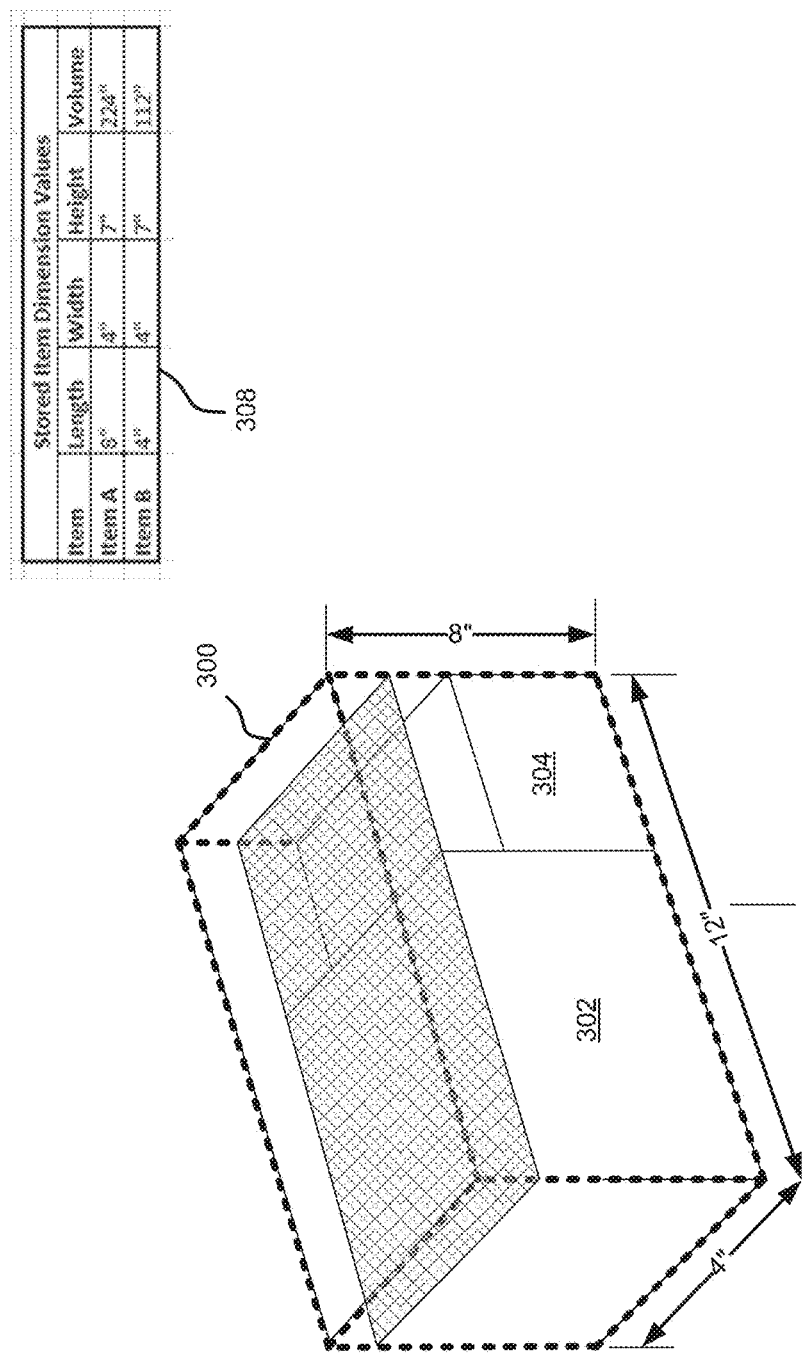
FIG. 3 is a block diagram of package containing a shipment set.

FIG. 3 illustrates an example of how a packaging recommendation service may select a package 300 to recommend for shipping a shipment set of two items 302, 304 and how the item dimension verification service can verify the accuracy of stored item dimension values, according to an implementation. In some implementations, the packaging recommendation service may be configured to recommend various packages suitable for shipping the shipment set based on stored item dimension values currently associated with the items 302, 304 of the shipment set. For example, the container recommendation service may recommend a particular container suitable for shipping a shipment set based on known or estimated dimension values of the items 302, 304 in the shipment set. Stored item dimension values may be provided by a manufacturer or supplier of the items, or based on a process of successive approximation as the items are handled within the facility. In many cases, knowing the exact dimensions of an item may not be necessary for selecting and recommending a package into which a group of items can be placed, because the "practical" or estimated dimensions of the items may provide a size range accurate enough to select a package from among a finite set of packages.

In some implementations, the packaging recommendation service may make particular assumptions about item dimensions or may assign item dimensions according to a standard algorithm, or company policy, in order to facilitate the recommendation of packages for shipment sets. For example, in one implementation, the item dimension having the largest value may be designated to be the "length," the dimension having the second largest value may be designated to be the "height," and the dimension having the smallest value may be designated to be the "width" of the item. In such implementations, the dimensions of packages may also be designated using the same assumptions. In other implementations, different assumptions or assignments may be made or the designation of length, height, and width dimensions of items or packages may be arbitrary. In some implementations, standards or policies may specify other aspects of the operations of the materials handling facility, such as a default placement for certain items within packages or a specific bin-packing algorithm to be assumed when recommending packages and/or estimating the cube utilization of a shipment set if placed in a particular candidate container (estimated package utilization). For example, various policies may specify that the largest (and/or heaviest) item in a shipment set should be placed horizontally along the bottom of the package and smaller items placed on top of the larger items.

As noted above, known and/or estimated item dimension values may be used to identify packages 300 whose volume and/or dimensions are appropriate for handling the shipment set. In addition, in some implementations, the dimension values and/or volume of the packaging materials and any other non-item contents may also be considered when recommending a package 300 for the shipment set. For example, the shipment set dimensions and promotional inserts, fill material dimensions and/or gift wrapping may be supplied to the packaging recommendation service as an input and may be used in determining the appropriate package for handling the shipment set and non-item contents.

In one implementation, the volume of a shipment set may be defined to be equal to the volume of a three-dimensional bounding box having length, width, and height equal to the length, width, and height of the items contained in the shipment set when arranged for packing, and the volume of a package may be defined to be the maximum volume of the interior of the package. In some implementations, the volume and dimensions of a group of items may be defined, respectively, to be the volume and corresponding dimensions of a three-dimensional bounding box having sufficient length, width, and height to contain all of the items in the shipment set. For example, in FIG. 3, a packaging recommendation may be determined using a particular packing algorithm that calculates the volume of a bounding box surrounding the items 302, 304. This may be done according to guidelines and conventions for packing one or more items (e.g., the packing algorithm may specify that the largest and/or heaviest item should be placed horizontally on bottom of the container first and additional items may be placed on top of, or next to, this item in order of their largest dimension value, their weight, etc.). In another implementation, the system may be configured to calculate a volumetric expected package utilization (e.g., the percentage of the container that would be filled by the item(s) and any non-item contents) for the item(s) when placed in packages of various sizes and shapes.

Based on the calculated expected package utilization, the system may then recommend a package 300 that is available within the fulfillment center that will maximize the utilization.

To continue with the above example, a package 300 may be recommended based on the stored dimension values for items included in a shipment set that is to be placed in the package for shipping. In this example, the dimension values of the recommended package 300 are 4"×8"×12" which provides 384 cubic inches. The stored item dimension values, as illustrated in Table 1 308 are: Item A 8"×4"×7", Item B 4"×4"×7". When the items 302, 304 are configured for packing as illustrated in FIG. 3 they provide a combined total of 336 cubic inches. Based on the total cubic inches of the recommended package 300 and the total cubic inches of the shipment set, which includes item A 302 and item B 304, the expected package utilization is 87.5% (336 in.$^3$/384 in.$^3$). However, when the shipment set of item A 302 and item B 304 is placed into the recommended package 300 and an image captured and analyzed, it is determined that the actual package utilization is only 75%. For example, the image may be analyzed and a determination made that 25% of the package 300 is empty.

In this case, the actual package utilization is only 75% because the actual dimension values of item B 304 are not the same as the stored dimension values illustrated in Table 1 308. In some implementations, any deviation from the expected package utilization may cause review of the stored dimension values of the items included in the shipment set. In other implementations, an expected utilization threshold may be established based off the expected package utilization and a determination made as to whether the actual package utilization is within the expected utilization threshold. For example, in this implementation if the expected package utilization is 87.5% the expected utilization threshold may allow deviation of plus or minus 5% from the expected package utilization. Anything below 82.5% or above 92.5% may result in the expected utilization threshold being exceeded and causing review of the stored dimension values of the items included in the shipment set.

In this example, because the actual package utilization is outside of the expected utilization threshold, the items of the shipment set may be identified as having stored dimension values that are potentially inaccurate. In some implementations, all of the items of the shipment set may be identified for review. In other implementations, the image(s) of the package with the contained shipment set may be further analyzed to identify which of the items of the shipment set are most likely to have inaccurate stored item dimension values.

Figure 4:
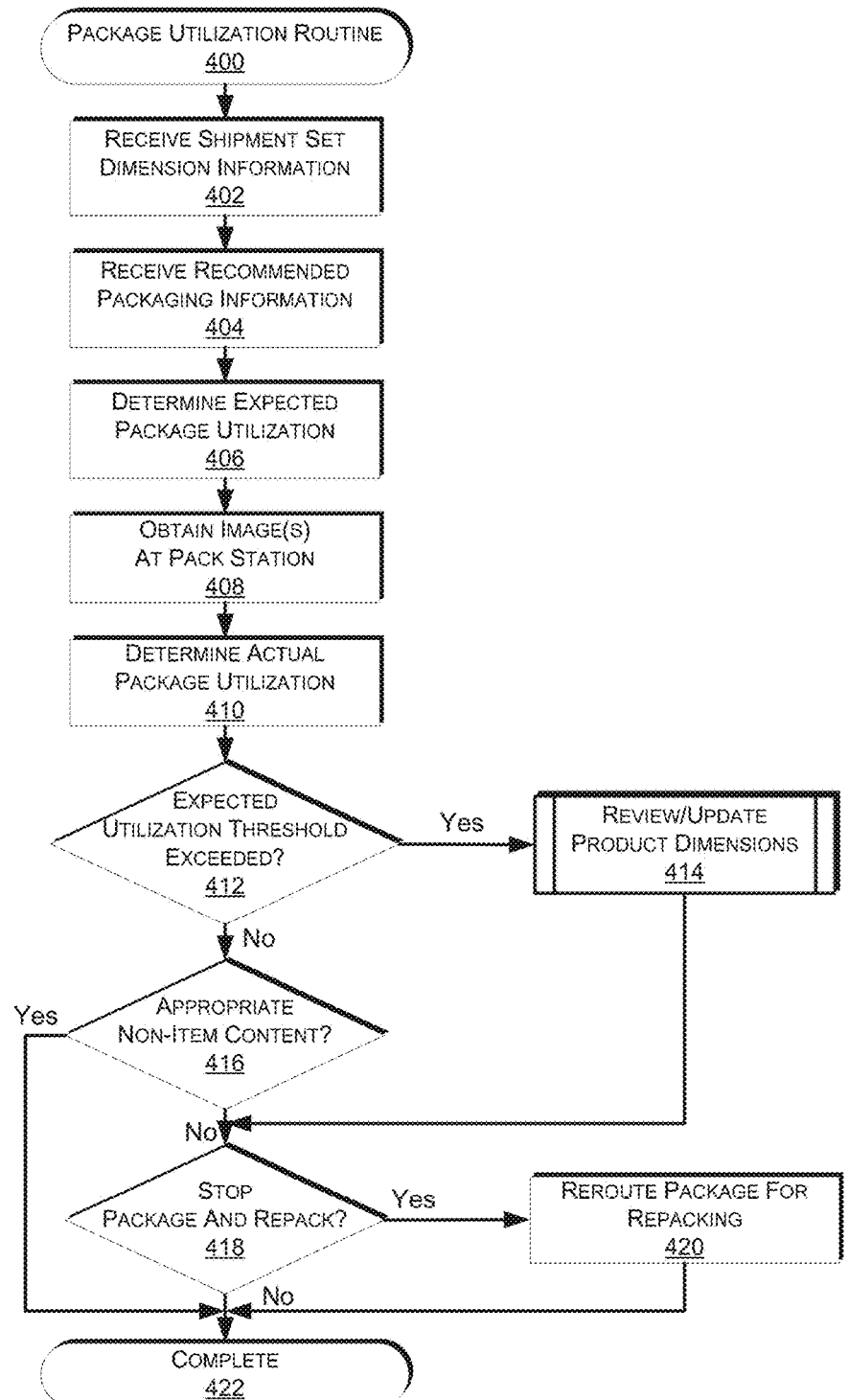
FIG. 4 is a flow diagram illustrating an example routine for a package utilization routine, in accordance with an implementation.

FIG. 4 is a flow diagram illustrating an example process for determining package utilization, according to an implementation. The process is illustrated as a collection of blocks in a logical flow graph. Some of the blocks represent operations that can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types.

The computer-readable media may include non-transitory computer-readable storage media, which may include hard drives, floppy diskettes, optical disks, CD-ROMs. DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded or uploaded through the Internet or other networks. Finally, the order in which the operations are described is not intended to be construed as a limitation, and any number of the described operations can be combined in any order and/or in parallel to implement the process. Likewise, additional or fewer operations than those described may be utilized with the various implementations described herein.

The example package utilization routine 400 begins by receiving shipment set dimension information, as in 402. As discussed above, shipment set dimension information may include, among other information, the stored dimension values of one or more items included in the shipment set. Likewise, the shipment set dimension information may also identify the configuration with which the items of the shipment set are to be placed into a recommended package. In addition to receiving shipment set dimension information, the example routine 400 may also receive an identification of the recommended packaging information, as in 404. The recommended packaging information may include an identification of the recommended package as well as the dimension values for the recommended package.

Based on the received shipment set dimension information and the received recommended package information, an expected package utilization may be determined, as in 406. For example, the shipment set dimension information may be used to determine the total dimension values that should be consumed by the items of the shipment set based off the length, width and height of those items and how they will be configured when placed into the recommended package. Based upon the total cubic inches computed from the shipment set, dimension information and the total cubic inches of the recommended package, the expected package utilization can be determined as discussed above.

As the items are picked and packed into the recommended package, one or more images are captured during packing, as in 408. Images may be captured as still images or as a series of images (i.e., video). Likewise, one or multiple imaging devices, such as cameras, may be utilized to capture images of the items of the shipment set as they are packed into the recommended package. Once the items have been placed into the recommended package, the image captured of the package containing the shipment set may be analyzed to determine actual package utilization, as in 410. As discussed above, actual package utilization may be determined by analyzing the image to identify the amount of unused space within the package. For example, the image(s) may be analyzed to determine physical size of the item(s) by identifying the edges of the item(s) and identifying the physical dimensions based upon the relative size of the item(s) in the image(s). In other examples, the surface of the items, when placed in the package may be identified, the top edges of the packages identified and an empty surface area within the package computed.

In some implementations, the example process 400 may also analyze the captured image to confirm that the packing being used corresponds with the recommended package. For example, as part of the image analysis, a bar code or other identifier located on the packaged may identified to confirm that the package is the recommended package. If the package in use is not the recommended package the example process 400 may complete. In other implementations, if the package in use is not the recommended package, the dimension values for the package being used may be identified and the example process 400 may continue using those dimension values.

Based on the actual package utilization and the expected package utilization, a determination may be made as to whether an expected utilization threshold has been exceeded, as in 412. The expected utilization threshold may be a percentage of deviation from the expected package utilization. In other implementations, the expected utilization threshold may be an absolute or dimensional difference from the expected package utilization. For example, if there are only a limited number of packages available for use within the materials handling facility, the expected package utilization may be set such that it is only exceed when the difference would have resulted in a recommendation for a different package.

If it is determined that the expected package utilization threshold has been exceeded, the example routine may review and/or update the item dimensions, as in subroutine block 414. Subroutine block 414 is described in further detail below with respect to FIG. 5.

If it is determined that the expected package utilization threshold has not been exceeded, a determination may be made as to whether the appropriate dunnage or other non-item contents have been placed into the package, as in 416. A determination as to whether the appropriate dunnage or other non-item contents have been placed into the package may be accomplished using the same and/or different images captured of the package containing the shipment set. For example, a series of images both before and after dunnage is placed into the package may be compared to determine the amount of dunnage that has been included. Based on the type of items included in the package and the amount of dunnage added, a determination may be made as to whether an appropriate amount of dunnage has been included in the package.

If it is determined that the appropriate non-item content has not been included in the package and/or after the review and update item dimensions subroutine 414 has completed, a determination may be made as to whether the package from which the image has been captured should be stopped from shipment and repacked, as in 418. In some implementations, any deviation from the appropriate non-item content or an incorrect estimation as to the item dimension values may result in the package being stopped from shipment and repacked. In other implementations, unless the item is likely to be damaged, the existing package may continue on to shipment. If it is determined that the package should be stopped from shipment and repacked, the example routine 400 may reroute the package for repacking, as in 420. However, if it is determined that the package should not be stopped from shipment, if it is determined that the appropriate dunnage is included in the package, or after the package has been rerouted for repacking, the example process 400 may complete, as in 422.

Figure 5:
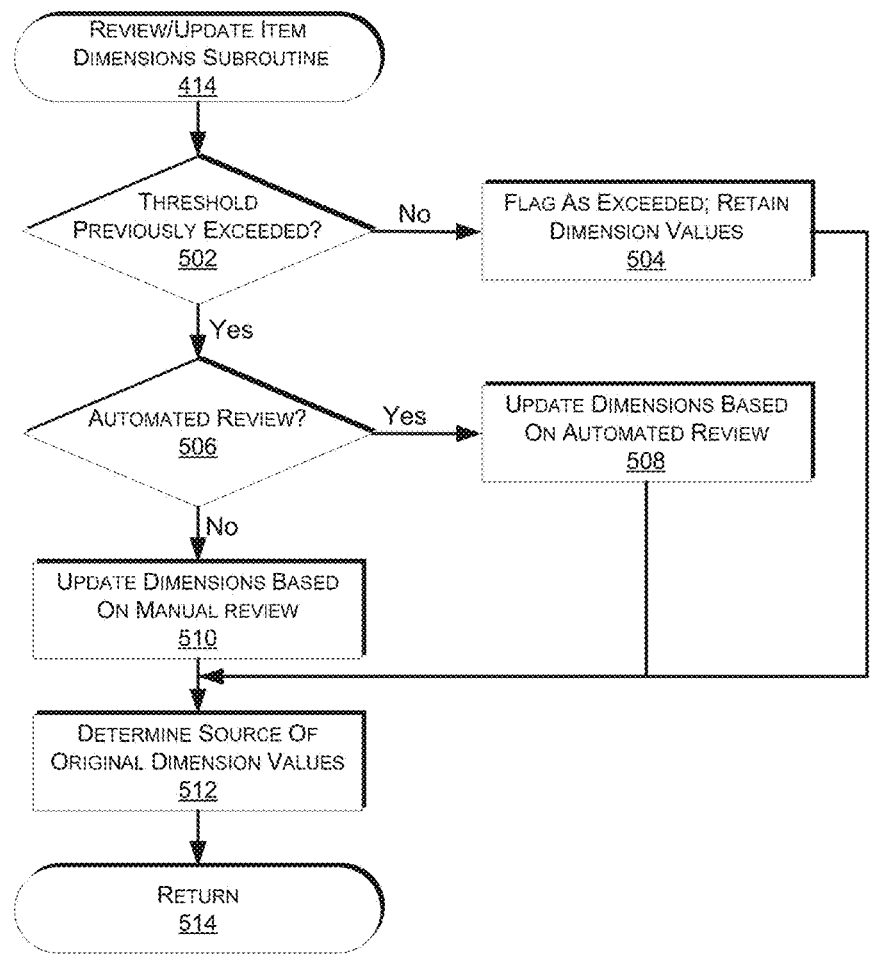
FIG. 5 is a flow diagram illustrating an example subroutine for reviewing and optionally updating item dimensions, in accordance with an implementation.

Turning now to FIG. 5, an example subroutine for reviewing and/or updating item dimension values in accordance with an implementation is described. The example subroutine 414 begins by determining whether the expected package utilization threshold has been previously exceeded for one or more items of the shipment set, as in 502. If it is determined that the expected package utilization threshold has not been previously exceeded, the items of the shipment set may be flagged as exceeding an expected package utilization but the stored dimension values otherwise retained, as in 504. This portion of the subroutine 414 may be optional and included to prevent against unnecessary re-measuring of item dimension values that have been flagged because they were packed inappropriately in other packages and/or because the images may not have been properly analyzed or captured. For example, in some implementations, before an item is flagged for review of the dimension values, it may need to be flagged a predetermined number of times as having potentially inaccurate stored item dimension values.

If it is determined that the expected item dimension values have been previously identified as potentially inaccurate, a determination may be made as to whether an automated review of the stored item dimension values is to be performed. In some implementations, a less intrusive review of the item dimension values may be initially done before additional more intrusive reviews are accomplished in an effort to automatically resolve inaccuracies in stored item dimension values. For example, once it has been determined that the item dimension values may be inaccurate, an automated process may be performed in an effort to update and/or correct the stored item dimension values. For example, if the item has been packed in the same recommended package multiple times and the same actual utilization has been computed each time, an automatic determination may be made as to the resulting dimension values based off of the actual utilization of the recommended package. Other processes may also be performed as an alternative to, or in addition to the automated review process. For example, a request may be sent to a social network for review of information about the item to determine if the stored dimension values are correct or need to be updated.

Returning to decision block 506, if it is determined that an automated review is not to be performed, for example an automated review has already been performed but the dimension values still appear to be inaccurate, the stored dimension values may be reviewed and updated manually, as in 510. The manual review process may be done by any person or group of individuals. For example, the example subroutine 414 may notify the seller of the item and/or provider of the dimension values of the item and request that they be reviewed and updated.

In addition to requesting manual update and review of the dimension values or after an automated review or flagging of the dimension values, a determination may also be made as to the source of the original dimension values that are believed to be inaccurate, as in 512. Determining and tracking the source of the dimension values that are believed to be inaccurate may be used to identify recurring problems with inaccurate dimension values which may be used to improve the overall catalog of stored dimension values. For example, as the example subroutine 414 processes over multiple items, if a same source of inaccurate dimension values is identified for multiple different items, additional training or feedback may be provided to that source to help improve the accuracy of provided information. Once the source of the original dimension values that are believed to be inaccurate has been identified and stored, the example subroutine 414 may complete, as in 514.

A packaging information system may be further described using the following example. In this example, an e-commerce organization sells items of various types that can be shipped to customers. Five example items are shown in an item parameter data store, in Table 1, below. In this example, the entry for each item includes a corresponding unique identifier, name, and type in columns 1-3. The item parameter data store also includes columns for storing values for various physical parameters of each item (columns 4-6), which in this example includes the item height, length, and width.

TABLE 1

| item ID | item name | item type | item height (in) | item length (in) | item width (in) |
|---------|-----------|-----------|------------------|------------------|-----------------|
| 4982 | book1 | book | 8.40 | 6.40 | 2.59 |
| 4325 | book2 | book | 8.29 | 6.40 | 2.59 |
| 2309 | plate38 | plate | 0.92 | 9.40 | 9.40 |
| 0873 | shoe17 | shoe | 14.00 | 8.00 | 6.54 |
| 1832 | DVD1 | DVD | 7.48 | 5.31 | 0.55 |

While not shown, in other implementations, additional information may be stored in an item parameters data store, such as the volume or weight of the item, a confidence level for the item dimension values, information on statistical variances in the dimension values, whether the item has been designated to receive special damage protection, whether the stored dimension values have been flagged as potentially inaccurate, or other indications of allowable deviations from the dimension values. In some implementations, a manufacturer or supplier may provide item dimension values for the items shown in Table 1. In other implementations, the item dimension values may be values measured automatically or by agents in the facility, or may be values that have been estimated based on various packages in which the items have been handled. The data store may also maintain multiple dimensions for items. For example, the item may have one set of dimensions if produced prior to a specific date but another set of dimensions if produced on or after that date. By maintaining this information in the data store, the appropriate dimensions may be used based on the item that was selected from inventory for packaging. In general, the dimension values of Table 1 may be used to recommend packages and to compute expected package utilization.

In some implementations, dimension values and/or other parameter values for the packages may be stored in one or more tables, databases, or other data structures, such as the package parameters data store illustrated in Table 2 below. In this example, a package identifier, a package name, and a package type are stored in each entry of Table 2 in columns 1-3. Dimension values for various packages are shown in columns 4-6. In some implementations, a manufacturer or supplier of a package may provide the values of various package parameters, including package dimensions and/or package volume. In other implementations, package parameters may be determined by measuring one or more instances of the package.

In this example, the available packages include three types of boxes in which items may be shipped and two types of mailing envelopes in which items may be shipped (as shown in rows 4-5 of the data store).

TABLE 2

| package ID | Package name | Package type | height (inches) | length (inches) | width (inches) |
|------------|--------------|--------------|-----------------|-----------------|----------------|
| 413 | smallbox1 | box | 19.0 | 13.0 | 11.75 |
| 293 | smallbox2 | box | 77.0 | 18.0 | 11.75 |
| 338 | bigbox1 | box | 24.00 | 16.00 | 16.00 |

TABLE 2-continued

| package ID | Package name | Package type | height (inches) | length (inches) | width (inches) |
|---|---|---|---|---|---|
| 557 | mailer1 | mailer | 0.25 | 5.00 | 5.00 |
| 806 | mailer2 | mailer | 0.40 | 9.00 | 12.00 |

In the example illustrated by Table 2, the values for the height, length, and width are shown for each package. In some implementations, a manufacturer or supplier may provide the volume along with the dimensions, while in other implementations, the packaging information system may calculate the volume from supplied or measured dimensions. In some implementations, additional information regarding various packages (e.g., the weight or volume of the standard packages, a strength rating, cost, or an indication of protective packaging materials or filler to be used in preparing items for shipment in the standard packages) may be maintained in a standard package parameters data store. In general, such a data store may include the values of more, fewer, or different parameters than those illustrated in Table 2.

Through use of the stored item dimension values (Table 1) and the stored package dimension values (Table 2), the packaging information system can compute expected package utilizations, expected utilization thresholds and determine whether the expected utilization thresholds have been exceeded.

Various operations of a packaging information system, such as those described herein, may be executed on one or more computer systems, interacting with various other devices in a materials handling facility, according to various implementations. One such computer system is illustrated by the block diagram in FIG. 6. In the illustrated implementation, a computer system 600 includes one or more processors 610A. 610B through 610N, coupled to a non-transitory computer-readable storage medium 620 via an input/output (I/O) interface 630. The computer system 600 further includes a network interface 640 coupled to an I/O interface 630, and one or more input/output devices 650. In some implementations, it is contemplated that a packaging information system may be implemented using a single instance of the computer system 600, while in other implementations, multiple such systems or multiple nodes making up the computer system 600 may be configured to host different portions or instances of a packaging information system. For example, in one implementation, some data sources or services may be implemented via one or more nodes of the computer system 600 that are distinct from those nodes implementing other data sources or services. In some implementations, a given node may implement the functionality of more than one component of a packaging information system.

In various implementations, the computer system 600 may be a uniprocessor system including one processor 610A, or a multiprocessor system including several processors 610A-610N (e.g., two, four, eight, or another suitable number). The processors 610A-610N may be any suitable processor capable of executing instructions. For example, in various implementations the processors 610A-610N may be general-purpose or embedded processors implementing any of a variety of instruction set architectures (ISAs), such as the x86, PowerPC, SPARC, or MIPS ISAs, or any other suitable ISA. In multiprocessor systems, each of the processors 610A-610N may commonly, but not necessarily, implement the same ISA.

The non-transitory computer-readable storage medium 620 may be configured to store executable instructions and/or data accessible by the one or more processors 610A-610N. In various implementations, the non-transitory computer-readable storage medium 620 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer-readable storage medium 620 as program instructions 625 and data storage 635, respectively. In other implementations, program instructions and/or data may be received, sent or stored upon different types of computer-accessible media, such as non-transitory media, or on similar media separate from the non-transitory computer-readable storage medium 620 or the computer system 600. Generally speaking, a non-transitory, computer-readable storage medium may include storage media or memory media such as magnetic or optical media, e.g., disk or CD/DVD-ROM coupled to the computer system 600 via the I/O interface 630. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 640.

In one implementation, the I/O interface 630 may be configured to coordinate I/O traffic between the processors 610A-610N, the non-transitory computer-readable storage medium 620, and any peripheral devices in the device, including the network interface 640 or other peripheral interfaces, such as input/output devices 650. In some implementations, the I/O interface 630 may perform any necessary protocol, timing or other data transformations to convert data signals from one component (e.g., non-transitory computer-readable storage medium 620) into a format suitable for use by another component (e.g., processors 610A-610N). In some implementations, the I/O interface 630 may include support for devices attached through various types of peripheral buses, such as a variant of the Peripheral Component Interconnect (PCI) bus standard or the Universal Serial Bus (USB) standard, for example. In some implementations, the function of the I/O interface 630 may be split into two or more separate components, such as a north bridge and a south bridge, for example. Also, in some implementations, some or all of the functionality of the I/O interface 630, such as an interface to the non-transitory computer-readable storage medium 620, may be incorporated directly into the processors 610A-610N.

The network interface 640 may be configured to allow data to be exchanged between the computer system 600 and other devices attached to a network, such as other computer systems, or between nodes of the computer system 600. In various implementations, the network interface 640 may support communication via wired or wireless general data networks, such as any suitable type of Ethernet network. For example, the network interface 640 may support communication via telecommunications/telephony networks such as analog voice networks or digital fiber communications networks, via storage area networks such as Fibre Channel SANs, or via any other suitable type of network and/or protocol.

Input/output devices 650 may, in some implementations, include one or more display terminals, keyboards, keypads, touchpads, scanning devices, voice or optical recognition devices, or any other devices suitable for entering or retrieving data by one or more computer systems 600. Multiple input/output devices 650 may be present in the computer system 600 or may be distributed on various nodes of the computer system 600. In some implementations, similar input/output devices may be separate from the computer system 600 and may interact with one or more nodes of the computer system 600 through a wired or wireless connection, such as over the network interface 640.

Figure 6:
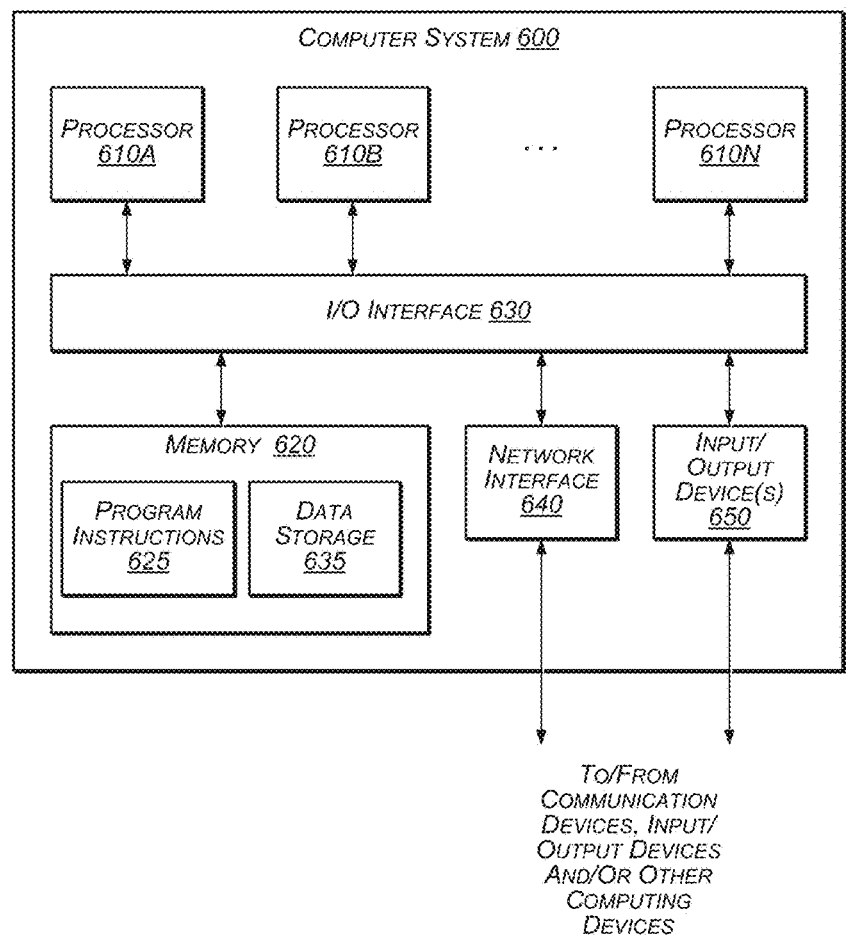
FIG. 6 is a block diagram illustrating an example computer system configured to implement one or more of the stacking and/or packing related operations described herein.

As shown in FIG. 6, the memory 620 may include program instructions 625 which may be configured to implement a packaging information system and data storage 635, which may comprise various tables, databases and/or other data structures accessible by the program instructions 625. In one implementation, the program instructions 625 may include various software modules configured to implement a planning service, a packaging recommendation service and/or an item dimension verification service. The data storage 635 may include various data stores for maintaining data representing physical characteristics of items and/or other item parameter values (such as those illustrated as being stored in Table 1), package parameter values (such as those illustrated as being stored in Table 2), shipping reports (not shown), actual or expected carrier shipping costs, packaging costs, avoidable shipping costs, package performance reports, etc. The data storage 635 may also include one or more data stores for maintaining data representing delivery related feedback, such as customer ratings, experiences and the like.

In various implementations, the parameter values and other data illustrated herein as being included in one or more data stores may be combined with other information not described or may be partitioned differently into more, fewer, or different data structures. In some implementations, data stores used in a packaging information system, or in components or portions thereof, may be physically located in one memory or may be distributed among two or more memories. These memories may be part of a single computer system or they may be distributed among two or more computer systems, such as two computer systems connected by a wired or wireless local area network, or through the Internet, in different implementations. Similarly, in other implementations, different software modules and data stores may make up a packaging information system and/or any of the various components thereof described herein.

Users may interact with the packaging information system (and/or various components thereof) in various ways in different implementations, such as to automatically measure and/or manually specify measured dimension values for items and/or packaging, to specify and/or modify thresholds to be used when determining suspect item dimensions, or to specify package performance reports to be generated and/or report parameters. For example, some users may have physical access to the computing system 600, and if so, may interact with various input/output devices 650 (e.g., user interface 750) to provide and/or receive information. Alternatively, other users may use client computing systems to access the packaging information system and/or its constituent components, such as remotely via the network interface 640 (e.g., via the Internet and/or the World Wide Web). In addition, some or all of the packaging information system components may provide various feedback or other general types of information to users (e.g., in response to user requests) via one or more input/output devices 650.

Those skilled in the art will appreciate that the computing system 600 is merely illustrative and is not intended to limit the scope of implementations. In particular, the computing system and devices may include any combination of hardware or software that can perform the indicated functions, including computers, network devices, internet appliances, PDAs, wireless phones, smartphones, etc. The computing system 600 may also be connected to other devices that are not illustrated, or instead may operate as a stand-alone system. In addition, the functionality provided by the illustrated components may in some implementations be combined in fewer components or distributed in additional components. Similarly, in some implementations the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated computing system via inter-computer communication. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various implementations may further include receiving, sending or storing instructions and/or data implemented in accordance with the foregoing description upon a computer-accessible medium. Accordingly, the techniques described herein may be practiced with other computer system configurations.

Those skilled in the art will appreciate that in some implementations the functionality provided by the methods and systems discussed above may be provided in alternative ways, such as being split among more software modules or routines or consolidated into fewer modules or routines. Similarly, in some implementations, illustrated methods and systems may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other implementations the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various methods and systems as illustrated in the figures and described herein represent example implementations. The methods and systems may be implemented in software, hardware, or a combination thereof in other implementations. Similarly, the order of any method may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer-readable storage medium, other aspects may likewise be so embodied. Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A computer-implemented method for verifying item dimension values, comprising:
    under control of one or more computing systems configured with executable instructions,
        receiving a first image of a package, the package including an item for shipment;
        receiving a second image of the package;
        generating, based at least in part on the first image and the second image, a three dimensional representation of the package;
        processing the three dimensional representation of the package to determine a plurality of edges of the item;
        determining a volume of the item based at least in part on the plurality of edges of the item;
        determining an amount of free space that remains within the package based at least in part on the volume of the item;
        determining, based at least in part on the amount of free space, an actual package utilization;
        determining that the actual package utilization exceeds an expected utilization threshold; and
        updating at least one stored dimension value of the item.

2. The computer-implemented method of claim 1, further comprising:
    determining a recommended package for the item;
    determining that the package is the recommended package;
    determining an expected package utilization for the recommended package; and
    wherein the expected utilization threshold is based at least in part on the expected package utilization.

3. The computer-implemented method of claim 1, wherein at least one of the first image and the second image are obtained at a pack station after the item is placed in the package.

4. The computer-implemented method of claim 3, wherein at least one of the first image or the second image are obtained after non-item content is placed in the package.

5. The computer-implemented method of claim 1, wherein the first image and the second image are obtained at a pack station before the package is closed for shipping.

6. The computer-implemented method of claim 1, wherein updating the at least one stored dimension value of the item includes:

determining that the expected utilization threshold has not previously been exceeded for the item; and
maintaining a stored dimension value of the item.

7. The computer-implemented method of claim 1, wherein updating the at least one stored dimension value of the item includes:
    determining that the expected utilization threshold has previously been exceeded for the item;
    determining a dimension value for the item; and
    replacing a stored dimension value for the item with the determined dimension value for the item.

8. The computer-implemented method of claim 7, wherein determining the dimension value includes an automated review of the item.

9. The computer-implemented method of claim 7, wherein determining the dimension value includes a manual review of the item.

10. A non-transitory computer-readable storage medium storing instructions for verifying dimension values for an item during packing, the instructions when executed by a processor causing the processor to at least:
    receive a first image of a package, the package including an item for shipment;
    receive a second image of the package;
    generate, based at least in part on the first image and the second image, a three dimensional representation of the package and the item within the package;
    process the three dimensional representation of the package to determine a plurality of edges of the item;
    determine, based at least in part on the plurality of edges, an amount of an interior of the package that is filled by the item;
    determine, based at least in part on the amount of the interior of the package that is filled by the item, an actual package utilization;
    determine, based at least in part on the actual package utilization, that at least one stored dimension value of the item is incorrect; and
    update the at least one stored dimension value of the item.

11. The non-transitory computer-readable storage medium of claim 10, the instructions when executed by the processor further causing the processor to at least:
    identify a recommended package for shipping the item; and
    determine that the package represented in the three dimensional representation is the recommended package.

12. The non-transitory computer-readable storage medium of claim 10, the instructions when executed by the processor further causing the processor to at least:
    process the three dimensional representation to determine an actual dimension value of the item.

13. The non-transitory computer-readable storage medium of claim 10, the instructions when executed by the processor further causing the processor to at least:
    determine a source of the at least one stored dimension value.

14. The non-transitory computer-readable storage medium of claim 10, the instructions when executed by the processor further causing the processor to at least:
    determine that appropriate dunnage is included in the package.

15. The non-transitory computer-readable storage medium of claim 10, the instructions when executed by the processor further causing the processor to at least:

determine that appropriate dunnage is not included in the package; and reroute the package for repacking.

16. An apparatus, comprising:
a pack station;
a first imaging device positioned above the pack station, the first imaging device configured to capture a first image of a package at the pack station subsequent to an item being placed in the package and prior to the package being closed;
a second imaging device positioned above the pack station, the second imaging device configured to capture a second image of the package at the pack station subsequent to the item being placed in the package and prior to the package being closed;
a computing system configured to at least:
generate, based at least in part on the first image and the second image, a three dimensional representation of the package;
processing the three dimensional representation of the package to determine a plurality of edges of the item;
determining, based at least in part on the plurality of edges, an amount of space that is filled by the item;
determine, based at least in part on the amount of space that is filled by the item, an actual package utilization corresponding to the package and the item;
determine if the actual package utilization exceeds an expected utilization threshold; and
cause a review of at least one stored dimension value of the item when the actual package utilization exceeds the expected utilization threshold.

17. The apparatus of claim 16, wherein the expected utilization threshold is a percentage difference from an expected package utilization.

18. The apparatus of claim 16, wherein the expected utilization threshold is a dimensional difference from an expected package utilization.

19. The apparatus of claim 16, wherein an expected package utilization is based at least in part on stored dimension values of the package and stored dimension values of the item.

20. The apparatus of claim 19, wherein the package is a recommended package.

* * * * *